United States Patent
Ng et al.

(10) Patent No.: US 7,269,312 B2
(45) Date of Patent: Sep. 11, 2007

(54) BIPOLAR RF-PHOTONIC TRANSVERSAL FILTER WITH DYNAMICALLY RECONFIGURABLE PASSBANDS

(75) Inventors: Willie Ng, Agoura Hills, CA (US);
Andrew Walston, Toledo, OH (US);
Robert R. Hayes, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 263 days.

(21) Appl. No.: 10/701,109

(22) Filed: Nov. 3, 2003

(65) Prior Publication Data

US 2005/0094928 A1    May 5, 2005

(51) Int. Cl.
*G02B 6/26* (2006.01)
(52) U.S. Cl. .............................. 385/27; 385/24; 385/37
(58) Field of Classification Search ...................... None
See application file for complete search history.

(56) References Cited

U.S. PATENT DOCUMENTS

| | | | | |
|---|---|---|---|---|
| 5,428,697 | A * | 6/1995 | Dolfi et al. ..................... | 385/24 |
| 6,137,442 | A * | 10/2000 | Roman et al. ............... | 342/375 |
| 6,215,592 | B1 * | 4/2001 | Pelekhaty .................... | 359/618 |
| 6,295,149 | B1 * | 9/2001 | Meli ............................. | 398/9 |
| 6,466,345 | B1 * | 10/2002 | Bousselet et al. ............. | 398/87 |
| 6,839,521 | B2 * | 1/2005 | Davis .......................... | 398/156 |
| 2002/0110314 | A1 * | 8/2002 | Connolly ..................... | 385/24 |
| 2002/0154858 | A1 * | 10/2002 | Kojima ........................ | 385/24 |

OTHER PUBLICATIONS

J.E. Van Der Merwe et al. Design of bipolar reflectively tapped optical fibre transversal filter. Electronics Letters, vol. 25 No. 3, pp. 186-188, Feb. 1989.*
X. Wang et al. Tunable all-optical incoherent bipolar delay-line filter using injection-locked Fabry-Perot laser and fibre Bragg gratings. Electronics Letters, vol. 36 No. 24, pp. 2001-2003, Nov. 2000.*
Minasian, R., "Photonics In Radio Astronomy: Connectivity With In-Built Signal Processing," *School of Electrical and Information Engineering*, University of Sydney, Australia, 25 pages total (1999).
You, N., et al., "Synthesis of WDM Grating-based Optical Microwave Filter with Arbitrary Impulse Response," *Digest of International Topical Meeting on Microwave Photonics*, paper F-9.2, pp. 223-226 (1999).
Zeng, F., et al., "Fiber Bragg-Grating-Based-All-Optical Microwave Filter Synthesis Using Genetic Algorithm," *Society of Photo-Optical Instrumentation Engineers*, vol. 42, No. 8, pp. 2250-2256 (Aug. 2003).

* cited by examiner

*Primary Examiner*—Rodney Bovernick
*Assistant Examiner*—M. Stahl
(74) *Attorney, Agent, or Firm*—Ladas & Parry

(57) ABSTRACT

An architecture that enables one to realize a FIR transversal filter with apodized, interlaced bipolar tap coefficients ($a_n$). The tap coefficients, $a_n$, are varied via the control of the optical powers emitted by an array of WDM laser sources. Also, a filter architecture where tap coefficients can be agilely reconfigured in both polarity and magnitude. One chirped fiber-grating may be used to implement a series of wavelength-dependent tap-weights. The filter designs can be utilized to eliminate the low-pass response centered at DC, allowing one to place the center frequency $(f_c)_1$ of the first passband at a targeted intermediate frequency (IF).

58 Claims, 8 Drawing Sheets

BIPOLAR RF-PHOTONIC TRANSVERSAL FILTER WITH DYNAMICALLY RECONFIGURABLE PASSBANDS

STATEMENT REGARDING FEDERALLY SPONSORED RESEARCH OR DEVELOPMENT

"The invention described herein was made in the performance of work under a DARPA Analog Signal Processing contract, and is subject to the provisions of Public Law F33615-02-C1184 in which the Contractor has elected to retain title.

BACKGROUND

1. Field

The present disclosure relates to the use of photonic links for signal distribution in antenna systems. More particularly, the present disclosure relates to a reconfigurable, bipolar RF-transversal filter that may be implemented via the application of wavelength division multiplexed (WDM) and optical-MEMS photonic technologies.

2. Description of Related Art

To discuss the closest prior art, some technical background for the synthesis of finite impulse response (FIR) transversal filters will be provided.

In general, photonic transversal filters may enable one to accomplish an assortment of signal processing operations. These signal processing operations may include, but are not limited to, coarse pre-filtering or fine frequency channelization for RF-signals that have been modulated onto optical carriers. Modulation of RF signals onto optical carriers may be used in photonically remoted antenna systems, such as the antenna system 100 illustrated in FIG. 1.

In the photonically remoted antenna system 100 depicted in FIG. 1, analog optical fiber links are used to transmit the received RF signal (from the antenna element 101 at the front end) to a base-station at the back-end of the system 100, where additional signal processing may be performed in a typically more secure and benign environment. In this manner, the RF or signal-processing hardware elements at the antenna system front end are minimized. In the system 100 depicted in FIG. 1, the RF-signal (received by the antenna 101) is modulated onto one or more optical carriers from continuous wave lasers 103 via the use of an optical modulator 102 (e.g. an electro-optic modulator (EOM) or electro-absorption modulator (EAM)). A first photonic transversal filter 104 may be used to accomplish some selective pre-filtering of the modulated RF-signal. Using a second EOM 106 and an optical local oscillator (LO) 105 signal, the optical carrier modulated with the RF signal can be down-converted to a convenient intermediate-frequency (IF) band signal. This IF signal can then be channelized by a channelizer 107 implemented by a WDM transversal filter. Conversion of the IF optical signal to an electrical signal may be accomplished by a photodetector 108. The photonic pre-processing and channelization steps typically allow for the reduction of the noise bandwidth seen by the analog-to-digital converters (ADC's) 109 used after photodetection. Channelization and pre-processing also serve to alleviate the load of digital signal processors 109 installed in such antenna systems 100.

As indicated above, a photonic transversal filter may be implemented from a FIR filter. FIG. 2A shows the general schematic of a unipolar FIR filter, realized using photonic tapped delay-lines. As shown in FIG. 2A, an optical signal is coupled into a series of optical splitters 201, which split off a portion of the optical signal, as denoted by the tap coefficients $a_1$ to $a_5$. The optical splitters 201 are separated by optical delay elements 202. In FIG. 2A, $\tau_d$ denotes the cascaded time-delay steps. The portions of the optical signal split or tapped from the optical splitters 201 are summed by a summing element 203, which then may provide an output to a photodiode 204 for conversion of the optical signal to an electrical signal.

For an optical input that consists of an impulse ($\delta$-function), one obtains an impulse response h(t) that is given by:

$$h(t) = \sum_{n}^{N} a_n \delta(t - n\tau_d)$$

where $a_n$ denotes the nth tap-coefficient. FIG. 2B shows the impulse response for the five tap filter shown in FIG. 2A.

The Fourier transform of this impulse response h(t) gives the following frequency response for the filter:

$$F(\omega) = \sum_{n}^{N} a_n e^{-jn\omega\tau_d}$$

The RF-response of the filter is given by $|F(\omega)|^2$. In the above, it is assumed that the delay increment, $\tau_d$, is much longer than the optical coherence time of the optical carrier. Thus, the signals in the different delay paths combine incoherently, i.e., as a sum of optical intensities. Therefore, the $a_n$'s represent intensity weighting coefficients. As such, they are restricted to values given by positive real numbers, if only unipolar detection is used, as depicted in FIG. 2B.

To synthesize a given filter response $F(\omega)$, one needs to find the appropriate tap-coefficients $a_n$. The free spectral range (FSR) of the filter response thus synthesized (i.e. from unipolar taps) is given by $FSR=(f_c)_1=\tau_d^{-1}$ and its finesse F is approximately N, the total number of taps. For taps of equal weight, i.e., equal $a_n$'s, the side lobe suppression ratio (SLSR) is only 13.5 dB. To achieve a higher SLSR, one needs to have filter architectures that can apodize the tap coefficients $a_n$. Finally, the single polarity FIR filter depicted in FIG. 2A will always exhibit a low pass response centered at DC—a bandpass feature that is undesirable for frequency channelization applications. Bipolar taps allow for the removal of the low pass response centered at DC.

FIG. 3A illustrates a filter architecture where tap-delays of opposite polarities are interlaced in the time-domain. As shown in FIG. 3A, an optical signal is first coupled into an upper branch 310 and a lower branch 320 by an optical coupler 301. Each branch 310, 320 comprises a series of optical splitters 201, which split off a portion of the optical signal in each branch 310, 320, as denoted by the tap coefficients $c_1$ to $c_{10}$. The optical splitters 201 are separated by optical delay elements 202. The portions of the optical signal split or tapped from the optical splitters 201 from each branch 310, 320 are summed by the summing elements 203.

In the FIR filter shown in FIG. 3A, the impulse responses of the upper and lower branches 310, 320 are directed, respectively, to the positive and negative inputs of a double-balanced receiver 330 (differential photodetector pair). The use of such a differential detector pair 330 allows an, the tap weight coefficients for the impulse response h(t), to be positive or negative real numbers. Notice that an extra time-delay 202 equal to $\tau_d/2$ is added in the lower branch 320 of the filter. Specifically, this extra delay-loop time-shifts, by $\tau_d/2$, all the impulse responses sent to the negative input port of the double-balanced receiver 330. After photodetection, an overall impulse response that is interlaced in a bipolar fashion is obtained—with tap-spacings equal to $\tau_d/2$, as can be seen in FIG. 3B. FIG. 3C shows the frequency domain response of the filter depicted in FIG. 3A. From FIG. 3C it can be seen that the lowpass response (centered at DC) is eliminated for this bipolar FIR filter. In fact, as shown in FIG. 3C, its first passband $(f_c)_1 = \tau_d^{-1}$, and its FSR is precisely $2(f_c)_1$.

FIG. 4 shows a schematic of prior art of an apparatus 400 that may be used to realize bipolar FIR filters. See, for example, N. You and R. A. Minasian, "Synthesis of WDM Grating-based Optical Microwave Filter with Arbitrary Impulse Response," *Digest of International Topical Meeting on Microwave Photonics*, paper F-9.2, pp. 223-226. See, also, Fei Zeng, Jianping Yao, and Stephen J. Mihailov, "Fiber Bragg-grating-based All-optical Microwave Filter Synthesis Using Genetic Algorithm," *Optical Engineering*, vol. 42, no. 8, August 2003, pp. 2250-2256.

As shown in FIG. 4, an optical input consists of multiple laser wavelengths $(\lambda_1, \lambda_2, \ldots \lambda_M)$ from one or more lasers 409. A photonic modulator 401 is used to modulate an RF signal onto the optical input having multiple wavelengths. Similar to the filter depicted in FIG. 3A, the modulated optical signal is split between an upper branch 410 and a lower branch 420. Each branch 410 comprises one or more in-line optical attenuator 402 and delay element 403 pairs, a circulator 406, and fiber gratings 407. Note that FIG. 4 depicts two in-line optical attenuator 402 and delay element 403 pairs in each branch 410, 420, but other embodiments may have additional in-line optical attenuator 402 and delay element 403 pairs. Typically, the optical signal in each branch will be split equally among the in-line optical attenuator 402 and delay element 403 pairs.

The tap-coefficients $a_n$ of this filter architecture are controlled via the use of in-line optical attenuators 402. The optical signal having M wavelengths is first routed through fiber-delays equal to $\tau_0, 2\tau_0, \ldots$ or $N\tau_0$. The optical signal is then sent, via the circulator 406, to the fiber-gratings 407 that are "stitched" together to generate wavelength-dependent time-delays $\Delta t_0, 2\Delta t_0, \ldots M\Delta t_0$. Line 440 depicts the path that the optical signal takes through the circulator 406 to the fiber gratings 407 and back. The circulators 406 then direct the optical signals to a double-balanced receiver 430 to produce an electrical signal proportional to the difference between the optical signal from the upper branch 410 and the optical signal from the lower branch 420.

Notice that two distinct fiber-gratings 407 are needed to generate, respectively, the wavelength-dependent time-delays for the positive and negative branches. Therefore, the two fiber-gratings 407 must be precisely matched in the time-delay spacings $\Delta t_0$—for two different sets of incident wavelengths $[(\lambda_1, \lambda_2, \lambda_3)$ and $(\lambda_4, \lambda_5, \lambda_6)]$ in some instances—to properly form the interlaced bipolar response as illustrated in FIGS. 3B and 3C. Otherwise, timing errors between "taps" with different polarities will be generated.

In the novel filter architecture disclosed in this application, only one fiber-grating is used to generate the wavelength-dependent time-delays. Therefore, the novel approach disclosed in this application offers substantial implementation advantages towards the realization of a bipolar filter. In addition, the use of wavelength-independent taps $\tau_0, 2\tau_0, \ldots N\tau_0$ in the prior art (as illustrated in FIG. 4) may place severe constraints on the type of multi-wavelength source one can employ to realize the filter. Typically, the coherence time $\tau_c$ (inverse of the linewidth) of the optical source used in the apparatus depicted in FIG. 4 must be smaller than $\tau_0$ to avoid optical interference effects that stem from the presence of coherent optical fields in the different delay branches (placed before the fiber gratings). Finally, the filter architecture shown in FIG. 4 will not allow for the arbitrary routing of a given time-delay "tap" (e.g. that for the time-delay $k_1\tau_0 + k_2\Delta t_0$, where $k_1 < N$ and $k_2 < M$) to the positive (or negative) input port of choice in the differential detector pair.

SUMMARY

Disclosed herein is the architecture of a reconfigurable, bipolar RF-transversal filter that may be implemented via the application of wavelength division multiplexed (WDM) and optical-MEMS photonic technologies. Using the disclosed filter architecture, the magnitude as well as polarity (positive or negative) of the filter's tap-coefficients, $a_n$, can be selectively set. For example, the filter tap coefficients, $a_n$, can be apodized to enhance the side lobe suppression ratio (SLSR) of the filter's passbands. The additional control of the polarity for an allows for the synthesis of a large class of RF bandpass characteristics. In one specific implementation, the tap-weights of the transversal filter are interlaced in a bipolar fashion. These interlaced bipolar taps will (i) eliminate the filter's low-pass response (centered at DC), i.e., the first passband of the filter is offset from DC; and (ii) offer a free spectral range (FSR) that is precisely $2(f_c)_1$, where $(f_c)_1$ is the center frequency of the first passband. The DC-offset passbands (e.g. Gaussian or rectangular) of these tap-interlaced bipolar filters are of great interest to the frequency channelization of microwave signals via the use of RF photonics.

Also disclosed is the architecture of an RF-photonic transversal filter that combines the advantages of (i) agile bandpass synthesis and reconfigurability, with (ii) a disclosed implementation that uses only one dispersive time-delay element—specifically, one chirped fiber grating—to generate the requisite time-delays for the filter. The latter advantage eliminates, in particular, the need to find matching chirped fiber gratings for the positive and negative taps of the transversal filter.

Another feature disclosed herein is the agile reconfiguration of tap-weight and tap-polarity for the transversal filters. In addition, some new passive components (e.g. an in-line Fabry-Perot etalon) and Micro-ElectroMechanical System (MEMS) optical switches—not considered at all in the prior art—are introduced in the disclosed architecture to accomplish the goal of agile reconfiguration.

DETAILED DESCRIPTION

This disclosure describes filter configurations that may be used for the channelization of RF-photonic signals in the frequency domain. A first and second embodiment present architectures that provide FIR transversal filters with apodized, interlaced bipolar tap coefficients ($a_n$). In these embodiments, the tap coefficients, $a_n$, may be varied via the control of the optical powers emitted by an array of WDM laser sources. A third embodiment presents a filter architecture where tap coefficients can be agilely reconfigured in both polarity and magnitude. In these embodiments, only one chirped fiber-grating is needed to implement a series of wavelength-dependent tap-weights. The filter designs may also be configured to eliminate the low-pass response centered at DC, allowing the placement of the center frequency $(f_c)_1$ of the first passband at a targeted intermediate frequency (IF).

Figure 5:
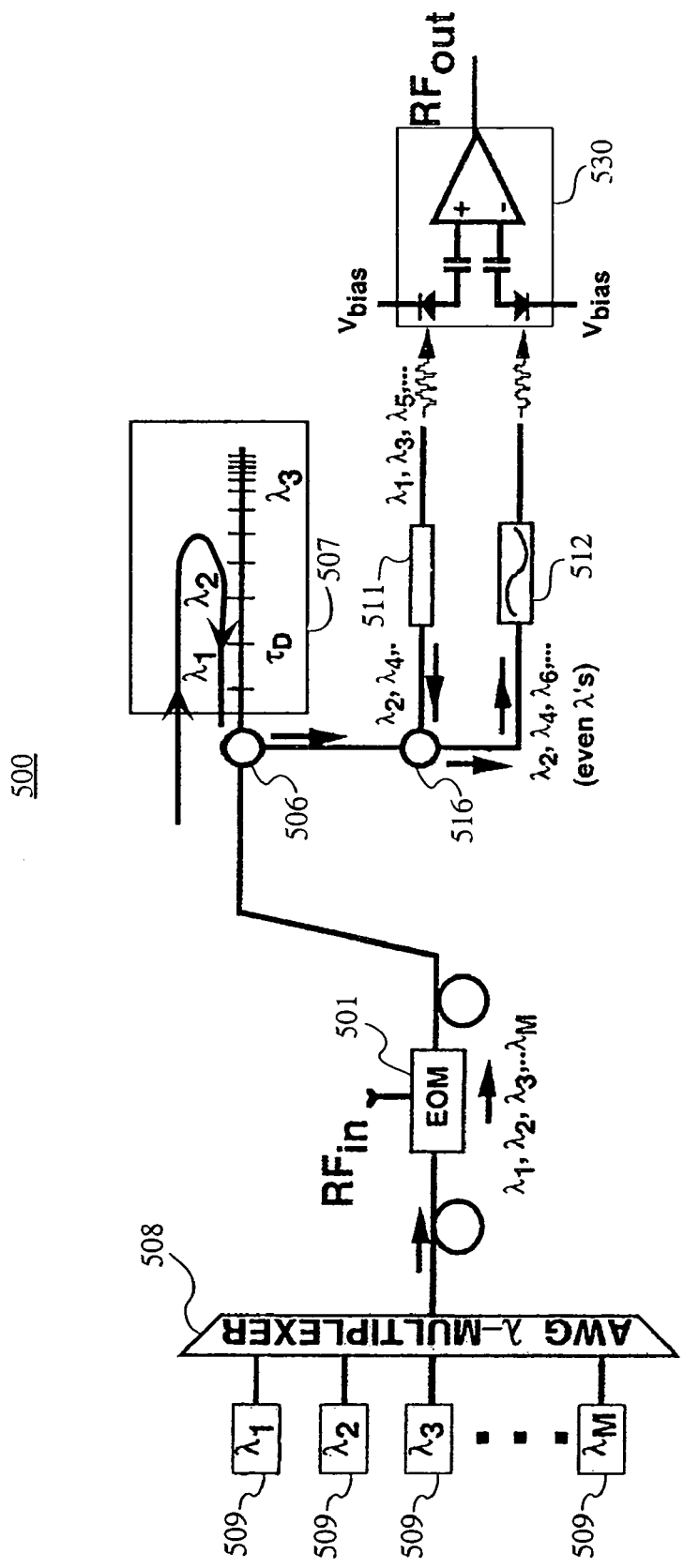
FIG. 5 shows an embodiment of a bipolar filter according to the present invention having interlaced tap coefficients using one chirped fiber grating and an in-line Fabry-Perot etalon.

FIG. 5 shows a schematic of a photonic link system 500 in which the first embodiment is used. As shown in FIG. 5, the outputs from M single-frequency lasers 509 (e.g. an array of distributed feedback (DFB) diode lasers) emitting at wavelengths $\lambda_1, \lambda_2, \ldots \lambda_M$ are multiplexed together. The output wavelengths of the lasers 509, $\lambda_1, \lambda_2, \ldots \lambda_M$ may be aligned along the ITU-grid, with a standard channel spacing ($\Delta f_{i,i+1}$, i=integer) of 100 GHz (i.e., $\Delta\lambda$=0.8 nm) near $\lambda$=1550 nm. Multiplexing of the laser outputs may be provided by an array-waveguide grating (AWG) multiplexer 508, although other multiplexing means known in the art may be used. The multiplexing loss (~5-6 dB) of an AWG multiplexer is almost independent of M, making it practical to employ a large number of input wavelengths.

After the RF signal has been modulated onto these M wavelengths with the use of, for example, an electro-optic modulator (EOM) 501, the modulated wavelengths are sent via a circulator 506 to a chirped fiber grating (CFG) 507. The grating period of the CFG 507 varies along its own length, so that each of the M wavelengths are reflected (back towards the circulator 506) at different positions along the grating 507. As a result, the incident wavelengths incur time-delays that vary linearly with their wavelengths.

Figure 1:
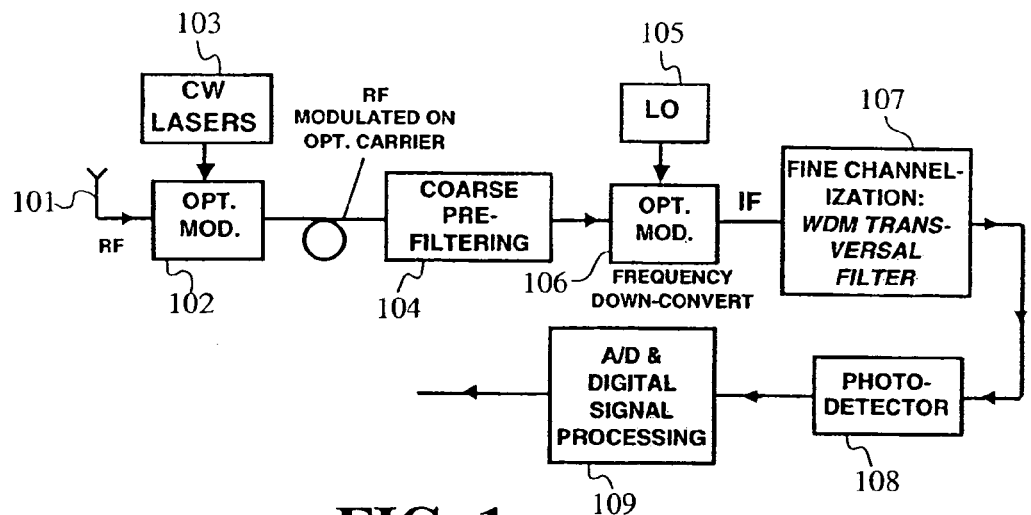
FIG. 1 (prior art) shows a photonic link system for use in a photonically remoted antenna system.
Figure 2A:
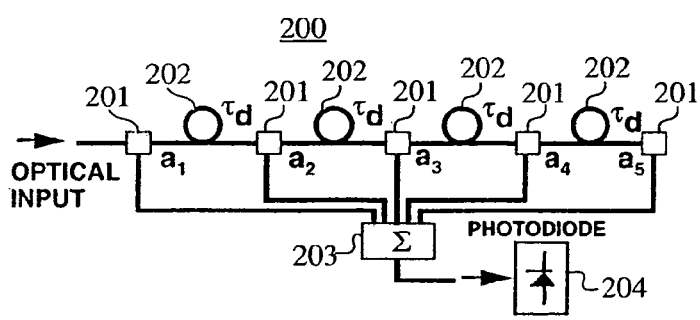
FIG. 2A (prior art) is a schematic of a single polarity photonic FIR filter.
Figure 2B:
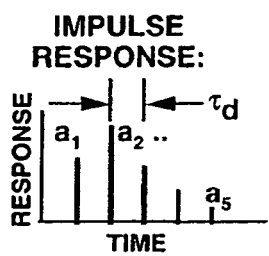
FIG. 2B (prior art) shows the impulse response for the filter of FIG. 2A.
Figure 3A:
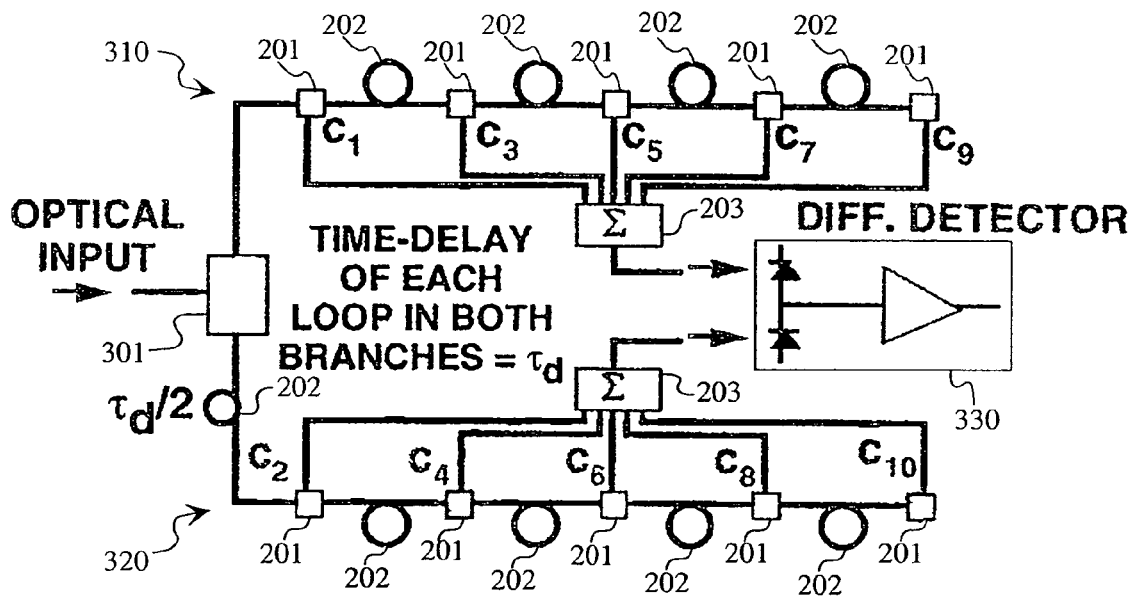
FIG. 3A (prior art) is a schematic of a photonic FIR filter with interlaced bipolar taps.
Figure 3B:
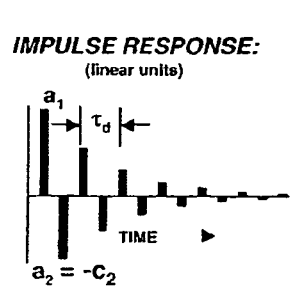
FIG. 3B (prior art) shows an impulse response for the filter of FIG. 3A.
Figure 3C:
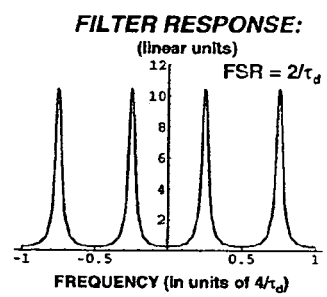
FIG. 3C (prior art) shows a filter response for the filter of FIG. 3A.
Figure 4:
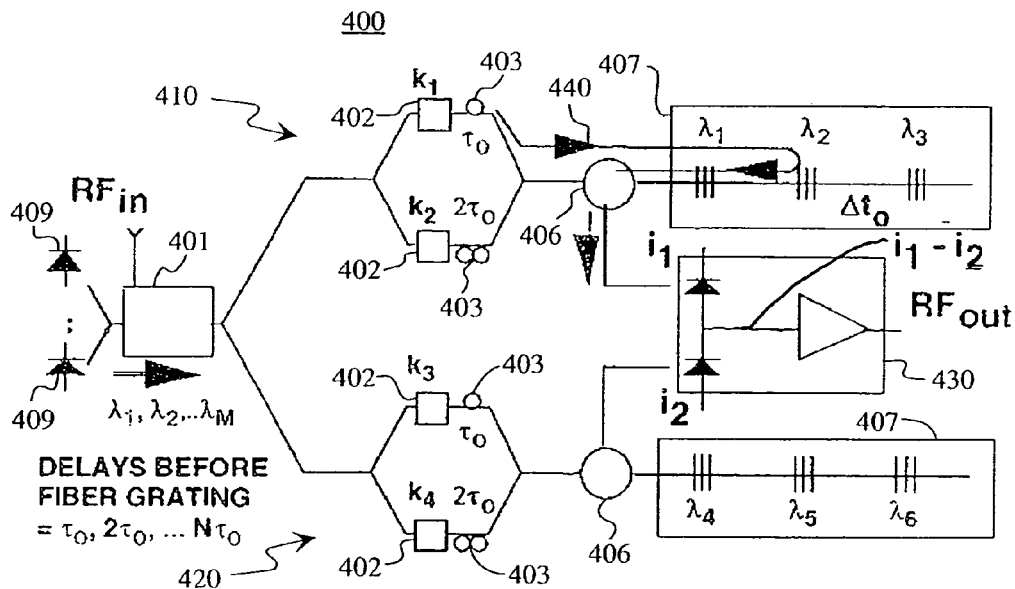
FIG. 4 (prior art) shows a WDM-based microwave filter using two sets of reflective fiber gratings for realizing positive and negative taps.
Figure 6A:
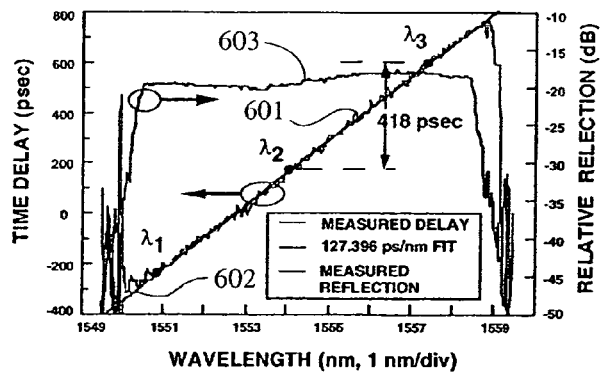
FIG. 6A shows the time-delay generated by the chirped fiber grating of the embodiment depicted in FIG. 5.
Figure 6B:
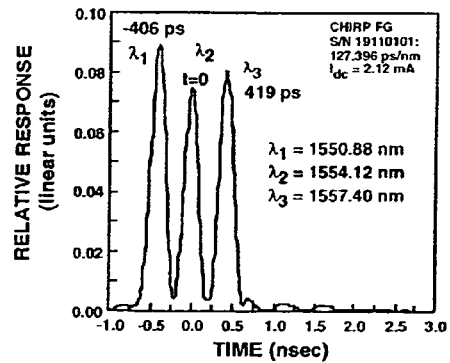
FIG. 6B shows the measured time-delay of a synthesized pulse input to the chirped fiber grating of the embodiment depicted in FIG. 5.

FIG. 6A shows a plot of expected time delay 602 and measured time-delay 601 (along with measured relative reflectivity 603) versus wavelength that has been utilized in experiments. For example, FIG. 6A shows a projected differential time-delay of ~418 psec between successive wavelengths ($\lambda_1, \lambda_2$, and $\lambda_3$) that are separated by ~3.2 nm. FIG. 6B shows measured time delay for synthesized pulses input to the CFG. The accuracy of the predicted differential time-delays is verified by experimental data shown in FIG. 6B, taken using a microwave network analyzer for the wavelengths $\lambda_1, \lambda_2$, and $\lambda_3$. It should be noted that these CFG's present a preferred technology to implement dispersive time-delays in transversal filter synthesis. If fiber gratings that are spliced together individually are used (as proposed by N. You and R. A. Minasian in "Synthesis of WDM Grating-based Optical Microwave Filter with Arbitrary Impulse Response," discussed above), the accuracy of the relative time-delay between the wavelengths may be much less predictable or controllable.

The wavelength-distinct, time-delayed pulses reflected from the CFG 507 are now routed, via passage of a second circulator 516, to an optical subfilter 511 that passes optical signals at the odd optical wavelengths while reflecting those optical signals at the even optical wavelengths (or vice versa). Preferably, the optical subfilter 511 comprises an in-line (fiber connectorized) Fabry Perot (FP) etalon 511. For the ITU grid spacing described above, the FP etalon should have a free spectral range $FSR_{FP}$, of 200 GHz, i.e. FSR=2$\Delta f_{i,i+1}$, twice the frequency separation between the incident wavelengths $\lambda_1, \lambda_2, \ldots \lambda_M$. Therefore, every two incident wavelengths in $\lambda_1, \lambda_2, \ldots \lambda_M$ will "see" a transmission maximum of the etalon 511. The transmission maxima of the FP etalon 511 will send, for example, all the odd-numbered wavelengths $\lambda_1, \lambda_3, \ldots \lambda_{2n+1}$ to the positive input port of a differential detector pair 530. On the other hand, the even wavelengths are coincident with the reflection maxima (centered precisely between two transmission maxima) of the FP etalon 511. Therefore, they will emerge from the output port of the second circulator 516, and be incident on the negative input port of the differential detector pair 530. Preferably, to make up for the path difference (after the first circulator 506) between the even and odd wavelengths, a variable delay-line 512 is used to equalize the propagation-delay between the two signal-paths.

Figure 7A:
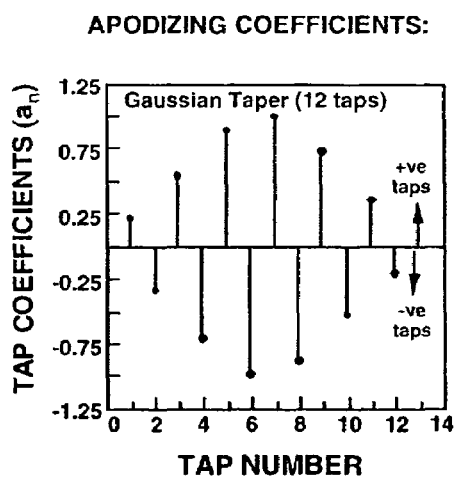
FIG. 7A is a graph of twelve bipolar-interlaced, Gaussian-Tapered taps that can be generated by the filter design of FIG. 5.
Figure 7B:
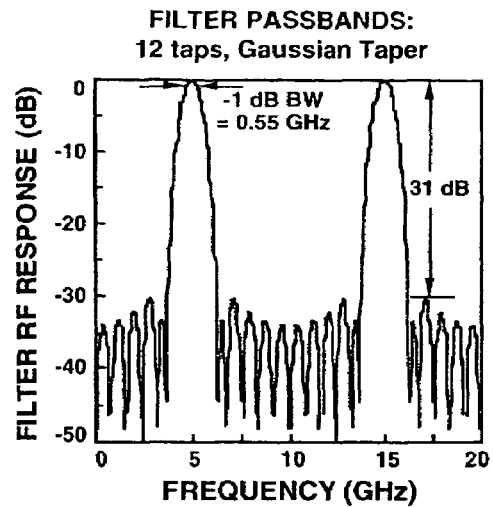
FIG. 7B is a graph of the RF response of the filter synthesized from the tap coefficients shown in FIG. 7A.

FIG. 7A and 7B, show, respectively, a set of twelve Gaussian-tapered, interlaced bipolar tap-weights, and the corresponding filter response that may be generated with the filter architecture shown in FIG. 5. As shown, an SLSR of 31 dB is obtained, which is much higher than the 13.5 dB observed for filters with equal tap-weights. In addition, by temperature tuning the wavelength separation between $\lambda_1$, $\lambda_2, \ldots \lambda_M$—but staying within the AWG-passband of ~0.4 nm—the center frequency of the first passband $(f_c)_1$ can be varied by ~±4%.

Figure 8A:
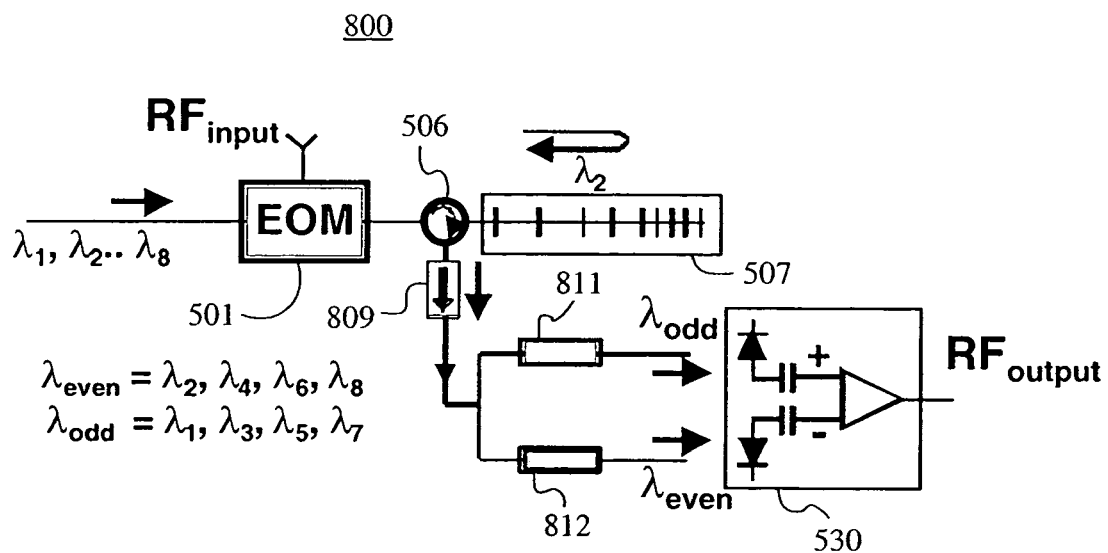
FIG. 8A shows an embodiment of a bipolar filter according to the present invention using one chirped fiber grating and two in-line Fabry-Perot etalons.

A second embodiment shown in FIG. 8A is similar to the first embodiment depicted in FIG. 5, except that no variable delay-line is used. As shown in FIG. 8A, a modulator 501 is again used to modulate an RF signal onto an optical signal comprising optical carriers at several wavelengths $\lambda_1$, $\lambda_2, \ldots \lambda_M$. Preferably, the wavelengths $\lambda_1, \lambda_2, \ldots \lambda_M$ are aligned along the ITU-grid, with a standard channel spacing ($\Delta f_{i,i+1}$, i=integer) of 100 GHz (i.e., $\Delta\lambda$=0.8 nm) near $\lambda$=1550 nm. The modulated optical signal is then directed by a circulator 506 into a CFG 507 which reflects the modulated optical signal back to the circulator 506.

Figure 8B:
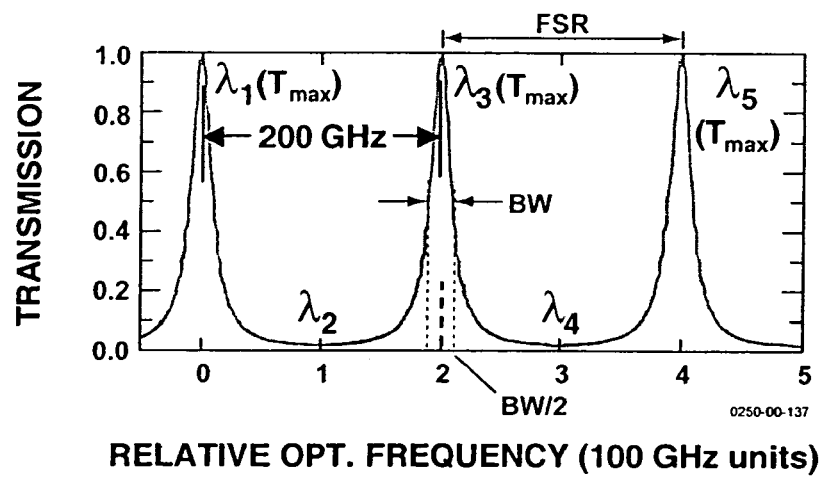
FIG. 8B shows the preferred frequency response for one of the Fabry-Perot etalons used in the device depicted in FIG. 8A.

The reflected optical signal is then directed through an optical isolator 809 and to a first optical subfilter 811 which passes only certain wavelengths of the reflected optical signal and to a second optical subfilter 812 which passes other wavelengths of the reflected optical signal. The first and second optical subfilters 811, 812 preferably comprise Fabry-Perot etalons 811, 812 that select wavelengths to be passed and wavelengths that are rejected. With a standard channel spacing of 100 GHz, each Fabry-Perot etalon 811, 812 preferably has a free spectral range of 200 GHz, i. e., twice that of the spacing between the successive optical carriers. Further, the passbands of the first Fabry-Perot etalon 811 are preferably offset from the passbands of the second Fabry-Perot etalon 812 by the channel spacing, i. e., 100 GHz. FIG. 8B shows the preferred passband characteristics for the first Fabry-Perot etalon 811 with maximum transmission at $\lambda_1$, $\lambda_3$ and $\lambda_5$ (i. e., the odd wavelengths). The second Fabry-Perot etalon 812 should have similar passband characteristics, except with maximum transmission at $\lambda_2$, $\lambda_4$ (i. e., the even wavelengths).

For example, the odd wavelengths ($\lambda_{odd}$) are transmitted through the first Fabry-Perot etalon 811 to the positive photodetector of the double-balanced receiver 530. The even wavelengths in this positive branch coincide with the stopband of the first Fabry-Perot etalon 811, and will not be transmitted to the upper photodetector of the double-balanced photoreceiver 530. Similarly, the even wavelengths ($\lambda_{even}$) are transmitted to the negative branch of the same photoreceiver 530, while the odd wavelengths in the branch are rejected. A polarity-interlaced series of tap-delays are generated similar to the first embodiment shown in FIG. 5. However, the second embodiment provides that the incident paths to the upper and lower photodetectors of the double-balanced receiver 530 are intrinsically balanced in amplitude and phase. This enables high SLSR ratio to be attained without the need to perform precise adjustments of the line-stretcher 512 shown in FIG. 5.

In the first and second embodiments, the magnitude of the tap-coefficients $a_n$ can be apodized via control of the optical power for each optical carrier sent to the modulator, for example, by controlling the power emitted by each DFB laser 509 in the source array. However, this does not provide for control over the polarity of the tap-weights. That is, the embodiments described above, for example, allow only the odd wavelengths and the corresponding tap weights to be directed to one input of the differential detector and only the even wavelengths and corresponding tap weights to be directed to the other input of the differential detector. A third embodiment that provides for the flexibility to reconfigure the magnitude as well as polarity of $a_n$ will now be described. The third embodiment shown in FIG. 9 allows for the selection of the individual wavelengths and, therefore, individual tap weights to be directed to either input of the differential detector, as described in additional detail below.

Figure 9:
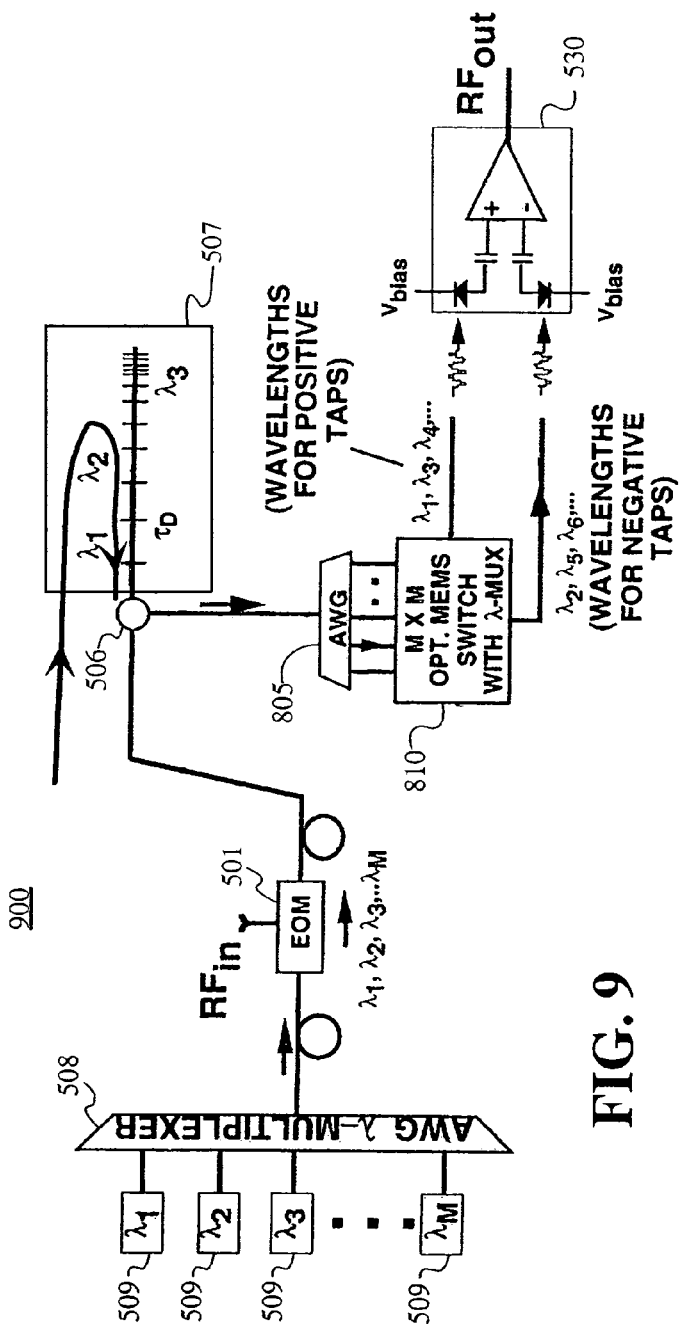
FIG. 9 shows an embodiment of a filter architecture according to the present invention where tap coefficients can be reconfigured in both polarity and magnitude.

FIG. 9 depicts a photonic link system 900 similar to that depicted in FIG. 5. In FIG. 9, the outputs from M single-frequency lasers 509 (e.g. an array of distributed feedback (DFB) diode lasers) emitting at wavelengths $\lambda_1, \lambda_2, \ldots \lambda_M$ are multiplexed together. The output wavelengths of the lasers 509, $\lambda_1, \lambda_2, \ldots \lambda_M$ may be aligned along the ITU-grid, with a standard channel spacing ($\Delta f_{i,i+1}$, i=integer) of 100 GHz (i.e., $\Delta\lambda$=0.8 nm) near $\lambda$=1550 nm. Multiplexing of the laser outputs may be provided by the array-waveguide grating (AWG) multiplexer 508, although other multiplexing means known in the art may be used.

After the RF signal has been modulated onto these M wavelengths with the use of, for example, an electro-optic modulator (EOM) 501, the modulated wavelengths are sent via a circulator 506 to a chirped fiber grating (CFG) 507. The grating period of the CFG 507 varies along its own length, so that each of the M wavelengths are reflected (back towards the circulator 506) at different positions along the grating 507.

Figure 9A:
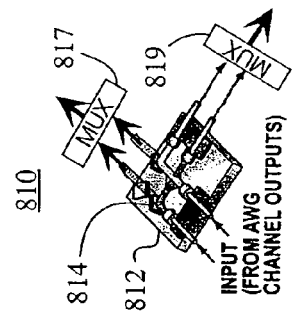
FIG. 9A shows the internal structure of a preferred embodiment of the optical MEMS switch and multiplexer used in the architecture depicted in FIG. 9.

The output of the circulator 506 is coupled to a second AWG 805 that demultiplexes the reflected wavelengths. That is, the second AWG 805 may produce M optical outputs corresponding to the M wavelengths originally multiplexed together by the first AWG 508. An apparatus 810 comprising a two dimensional optical switch array and multiplexers is then used to switch the individual wavelengths to a multiplexer coupled to the positive input of the differential detector pair 530 or to a multiplexer coupled to the negative input of the differential detector pair 530. Preferably, the two dimensional optical switch array within the apparatus 810 comprises an optical Micro Electromechanical System (MEMS) switch array 812, such as the one depicted in FIG. 9A. Depending on the specific switch settings, individual wavelengths of $\lambda_1, \lambda_2, \ldots \lambda_M$ can be made to turn a 90° angle with a MEMS mirror 814 (as shown in FIG. 9A), and be routed to the positive input (as for $\lambda_1, \lambda_3, \lambda_4$. in FIG. 9); or follow a straight-through path to the negative input (as for $\lambda_2, \lambda_5, \lambda_6$... in FIG. 9). This allows the selection of the polarity of each tap-weight $a_n$—with each $a_n$ corresponding to the signal intensity of a wavelength—for filter synthesis. Preferably, as shown in FIG. 9A, all the wavelengths for the positive input are multiplexed together in the apparatus 810 with a first wavelength multiplexer 817 and the wavelengths for the negative input are multiplexed together with a second wavelength multiplexer 819.

Figure 10A:
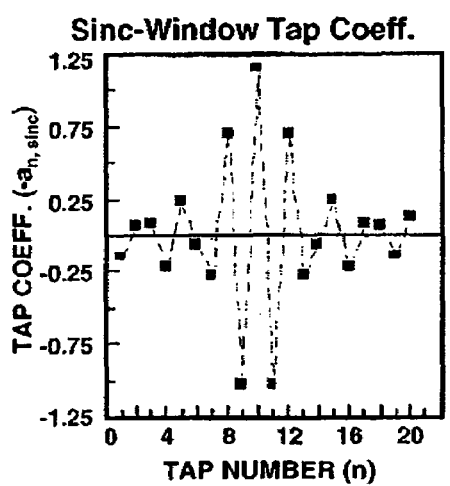
FIG. 10A shows the tap coefficients for sinc-window apodization implemented using the architecture depicted in FIG. 9.
Figure 10B:
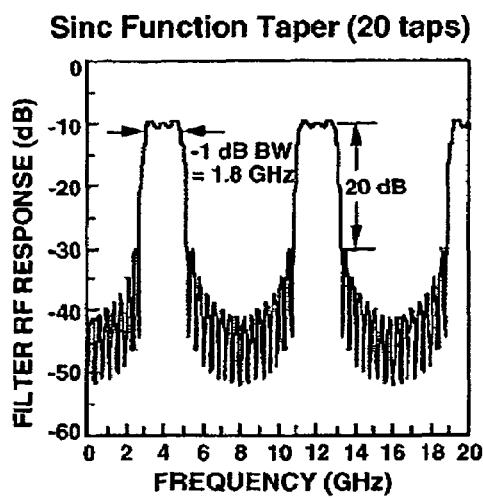
FIG. 10B shows the corresponding response of the filter synthesized using the tap coefficients shown in FIG. 10A.

FIGS. 10A, 10B, 11A and 11B illustrate the synthesis of filters that use the embodiment disclosed in FIG. 9. FIG. 10A and 10B show, respectively, the tap-weights and resulting filter passbands for a "sinc-window" apodization. Notice, as illustrated in FIG. 10A, that this apodization is no longer bipolar-interlaced, that is, there are successive tap-weights with the same polarity for the sinc-window apodization. The resulting passbands are roughly rectangular in shape, with a −1 dB bandwidth of 1.8 GHz, a SLSR of 20 dB, and a FSR that is, again, $2(f_c)_1$=8 GHz.

Figure 11A:
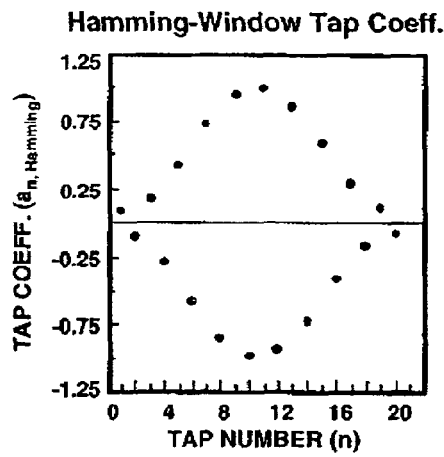
FIG. 11A shows the tap coefficients for Hamming-window apodization implemented using the architecture depicted in FIG. 9.
Figure 11B:
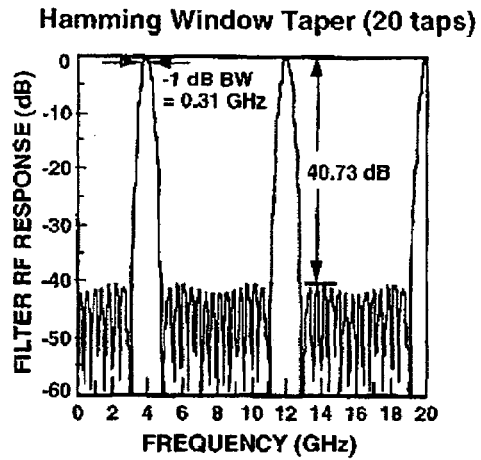
FIG. 11B shows the corresponding response of the filter synthesized using the tap coefficients shown in FIG. 11A.

Next, as shown in FIG. 11A, by changing the magnitude and polarity of an, a Hamming window apodization of the tap-weights can be created, giving rise to a larger SLSR of ~41 dB, narrower filter passband width of 0.31 GHz, and yet the same FSR, as seen in FIG. 11B.

Figure 12A:
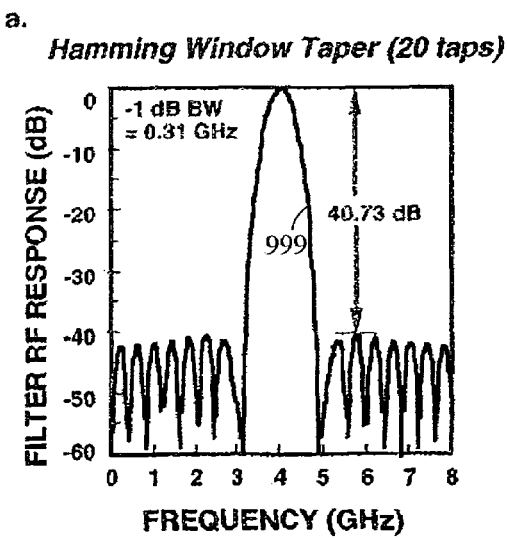
FIG. 12A shows the first passband of a bipolar interlaced filter according to the architecture depicted in FIG. 9 with 20 Hamming window apodized taps.
Figure 12B:
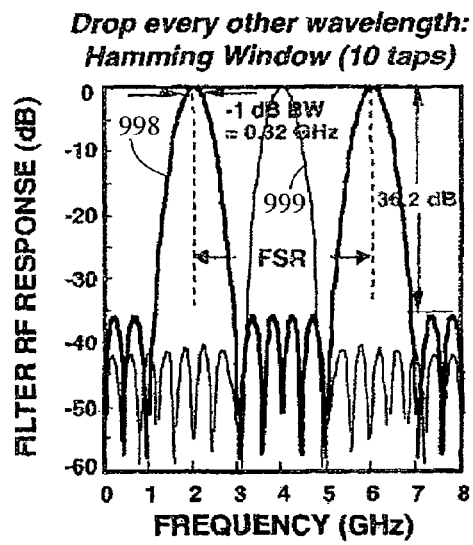
FIG. 12B shows the first two passbands of a filter according to the architecture depicted in FIG. 9 formed by dropping every other wavelength in the source array of lasers.

Finally, further control over the passband of the filter according to embodiments of the present invention can be provided by turning off (or dropping) every other laser wavelength in the source array of lasers 509. This doubles the time-delay $\tau_d$ between successive taps, and will, in turn, reduce the FSR and $(f_c)_1$ of the bipolar filter by exactly one-half. FIG. 12A shows the first passband of the filter with a Hamming window taper (for 20 bipolar interlaced-taps) with the use of the entire array of laser 509. FIG. 12B shows the response 998 when every other wavelength in the source array of lasers 509 is dropped, but the same CFG 507 for generating the wavelength-dependent time-delays is kept. This results in 10 taps with twice the time-delay between taps. The response 999 of the 20-tap filter of FIG. 12A is superimposed in FIG. 12B for comparison.

Those skilled in the art will understand that other filter responses may be obtained by using other tapers for the tap coefficients and/or selecting other wavelengths to add or drop.

From the foregoing description, it will be apparent that the present invention has a number of advantages, some of which have been described herein, and others of which are inherent in the embodiments of the invention described or claimed herein. Also, it will be understood that modifications can be made to the device and method described herein without departing from the teachings of subject matter described herein. As such, the invention is not to be limited to the described embodiments except as required by the appended claims.

What is claimed is:

1. A bipolar transversal filter, comprising:
   a first circulator for receiving a composite optical signal having optical signals at multiple wavelengths;
   a fiber grating coupled to said circulator, said fiber grating receiving said composite optical signal from said circulator and transmitting a reflected composite optical signal back to said circulator; and
   an optical filter receiving said reflected composite optical signal and providing optical signals at selected wavelengths at a first output and providing optical signals at other selected wavelengths at a second output, wherein said optical filter comprises:
   a second circulator receiving said reflected composite optical signal from said first circulator;
   an optical subfilter coupled to said second circulator, said optical subfilter passing optical signals at selected optical wavelengths to said first output and reflecting optical signals at other selected wavelengths back to said second circulator; and
   an optical delay element having an input coupled to said second circulator and an output coupled to said second output, said optical delay element receiving the optical signals reflected by the optical subfilter, wherein said optical delay element has an adjustable delay.

2. The bipolar transversal filter according to claim 1, wherein said optical subfilter comprises a Fabry-Perot etalon.

3. The bipolar transversal filter according to claim 2, wherein said composite optical signal comprises optical signals spaced at 100 GHz spacing and said Fabry-Perot etalon has a free spectral range of 200 GHz and said Fabry-Perot etalon passes optical signals at every other spacing.

4. A bipolar transversal filter, comprising:
   means for applying wavelength-dependent time delays to multiple optical signals at different wavelengths, said means for applying wavelength-dependent time delays receiving a composite optical signal comprising multiple optical signals at different wavelengths, and providing a delayed composite optical signal comprising multiple optical signals at different wavelengths with different delays;
   means for directing said composite optical signal into said means for applying wavelength-dependent time delays and directing said delayed composite optical signal out of said means for applying wavelength-dependent time delays; and
   gratinless means for filtering, said gratingless means for filtering receiving said delayed composite optical signal and filtering said delayed composite optical signal to provide one or more optical signals at selected optical wavelengths at a first output and one or more optical signals at other selected optical wavelengths at a second output, wherein said gratingless means for filtering comprises:
   means for subfiltering, said means for subfiltering passing optical signals at selected optical wavelengths to said first output and reflecting optical signals at other selected optical wavelengths; and
   means for delaying, said means for delaying receiving said optical signals at other selected optical wavelengths, delaying said optical signals at other selected optical wavelengths, and providing said delayed optical signals to said second output.

5. The bipolar transversal filter according to claim 4, wherein said means for subfiltering comprises a Fabry-Perot etalon.

6. The bipolar transversal filter according to claim 5, wherein said composite optical signal comprises optical signals spaced at 100 GHz spacing and said Fabry-Perot etalon has a free spectral range of 200 GHz and said Fabry-Perot etalon passes optical signals at every other spacing.

7. The bipolar transversal filter according to claim 4, wherein said means for delaying has an adjustable delay.

8. The bipolar transversal filter according to claim 4, wherein the optical powers of the multiple optical signals at different wavelengths are controlled to produce a desired response from said bipolar transversal filter.

9. The bipolar transversal filter according to claim 4, wherein said means for applying wavelength-dependent time delays comprises a chirped fiber grating.

10. The bipolar transversal filter according to claim 4, wherein said means for directing comprises an optical circulator.

11. A method of filtering a composite optical signal comprising multiple optical signals at different wavelengths, said method comprising:
    delaying said multiple optical signals at different wavelengths with different delays dependent on said different wavelengths to provide a delayed composite optical signal; and
    filtering said delayed composite optical signal without a grating to provide one or more optical signals at selected optical wavelengths at a first output and one or more optical signals at other selected optical wavelengths at a second output, wherein said filtering said delayed composite optical signal comprises:
    subfiltering said delayed composite optical signal to pass optical signals at selected optical wavelengths to said first output and reflecting optical signals at other selected optical wavelengths;
    delaying said one or more optical signals at other selected optical wavelengths by a selected delay; and
    providing said delayed optical signals to said second output.

12. The method according to claim 11, wherein said subfiltering comprises directing said delayed composite optical signal to a Fabry-Perot etalon.

13. The method according to claim 12, wherein said composite optical signal comprises optical signals spaced at 100 GHz spacing and said Fabry-Perot etalon has a free spectral range of 200 GHz and said Fabry-Perot etalon passes optical signals at every other spacing.

14. The method according to claim 11, wherein the optical powers of the multiple optical signals at different wavelengths are controlled to produce a desired response.

15. The method according to claim 11, wherein said delaying said multiple optical signals comprises directing said composite optical signal to a chirped fiber grating.

16. A photonic link system, comprising:
an array-waveguide grating multiplexer having one or more optical inputs and an optical output port having a first optical output;
an electro-optic modulator for modulating an RF signal onto the first optical output; a first circulator for receiving a second optical output from the electro-optic modulator, sending the second optical output to a chirped fiber grating, and sending an optical signal reflected from the chirped fiber grating to a second circulator;
an etalon receiving the reflected optical signal from the second circulator and producing a first optical signal and reflecting a second optical signal to the second circulator, the first optical signal sent to a first input port of a differential detector; and
a variable delay line for receiving the second optical signal from the second circulator and equalizing the propagation delay of the second optical signal, the second optical signal being sent to a second input port of the differential detector.

17. The system according to claim 16, wherein the one or more optical inputs comprise one or more lasers, each laser having an associated wavelength.

18. The system according to claim 17, wherein a grating period of the chirped fiber grating varies along its own length such that each of the wavelengths are reflected back towards the first circulator at different positions along the grating.

19. The system according to claim 17, wherein a magnitude of one or more tap-coefficients are apodized by controlling a power associated with each laser.

20. The system according to claim 16 wherein the etalon comprises an in-line fiber-connectorized Fabry Perot etalon.

21. A photonic link system, comprising:
an array-waveguide grating multiplexer having one or more optical inputs and an optical output port having a first optical output;
an electro-optic modulator for modulating an RF signal onto the first optical output; a first circulator for receiving a second optical output from the electro-optic modulator, sending the second optical output to a chirped fiber grating, and sending an optical signal reflected from the chirped fiber grating to an optical isolator;
a first etalon receiving the reflected optical signal from the optical isolator and producing a first optical signal, the first optical signal sent to a first input port of a differential detector; and
a second etalon receiving the reflected optical signal from the optical isolator and producing a second optical signal, the second optical signal sent to a second input port of the differential detector.

22. The system according to claim 21, wherein the one or more optical inputs comprise one or more lasers, each laser having an associated wavelength.

23. The system according to claim 22, wherein a grating period of the chirped fiber grating varies along its own length such that each of the wavelengths are reflected back towards the first circulator at different positions along the grating.

24. The system according to claim 22, wherein a magnitude of one or more tap-coefficients are apodized by controlling a power associated with each laser.

25. The system according to claim 21 wherein each etalon comprises an in-line fiber-connectorized Fabry-Perot etalon.

26. A photonic link system, comprising:
an array-waveguide grating multiplexer having one or more optical input ports and an optical output port having a first optical output;
an electro-optic modulator for modulating an RF signal onto the first optical output; a circulatorreceiving a second optical output from the electro-optic modulator and sending the second optical output to a chirped fiber grating;
an array-waveguide grating demultiplexer for receiving an optical signal reflected from the chirped fiber grating and producing one or more demultiplexed optical outputs; and
an optical microelectromechanical system switch receiving said one or more demultiplexed optical outputs and switching said one or more demultiplexed optical outputs to a first multiplexer or to a second multiplexer, said first multiplexer coupled to a first input port of a differential detector and said second multiplexer coupled to a second input port of the differential detector.

27. The system of claim 26, wherein the one or more optical inputs comprise one or more lasers, each laser having an associated wavelength.

28. The system of claim 27, wherein a grating period of the chirped fiber grating varies along its own length such that each wavelength is reflected back towards the first circulator at different positions along the grating.

29. The system of claim 27, wherein a magnitude of one or more tap-coefficients can be apodized by controlling a power associated with each laser and wherein a polarity of each tap coefficient can be set arbitrarily.

30. A method of processing an RF signal, comprising:
multiplexing one or more optical inputs;
modulating an RF signal onto the one or more optical inputs; sending the one or more modulated optical inputs to a chirped fiber grating; routing pulses reflected from the chirped fiber grating to an etalon;
sending a first group of pulses through the etalon to a first input port of a differential detector; and
sending a second group of pulses reflected from the etalon to a second input port of the differential detector.

31. The method of claim 30, wherein sending the one or more modulated optical inputs to a chirped fiber grating further comprises:
receiving at a first circulator the one or more modulated optical inputs from the electro-optic modulator; and
sending the one or more modulated optical inputs from the first circulator to the chirped fiber grating.

32. The method of claim 31, wherein routing pulses reflected from the chirped fiber grating further comprises:
sending pulses reflected to the first circulator from the chirped fiber grating to a second circulator;

wherein the etalon accepts the first group of pulses from the second circulator and reflects the second group of pulses to the second circulator; and wherein a variable delay line receives the second group of pulses from the second circulator and equalizes the propagation delay of the second group of pulses.

33. The method of claim 30, further comprising controlling the optical power of at least one of the one or more optical inputs.

34. A method of processing an RF signal, comprising:
multiplexing one or more optical inputs;
modulating an RF signal onto the one or more optical inputs;
sending the one or more modulated optical inputs to a chirped fiber grating;
routing pulses reflected from the chirped fiber grating to a first etalon and a second etalon;
sending a first group of pulses through the first etalon to a first input port of a differential detector; and
sending a second group of pulses through the second etalon to a second input port of the differential detector.

35. The method of claim 34, wherein sending the one or more modulated optical inputs to a chirped fiber grating further comprises:
receiving the one or more modulated optical inputs at a first circulator; and
sending the one or more modulated optical inputs from the first circulator to the chirped fiber grating.

36. The method of claim 35, wherein routing pulses reflected from the chirped fiber grating further comprises:
sending pulses reflected to the first circulator from the chirped fiber grating to an optical isolator;
wherein the first etalon receives pulses reflected from the chirped fiber grating and passes optical signals at selected wavelengths to produce said first group of pulses; and
wherein the second etalon receives pulses reflected from the chirped fiber grating and passes optical signals at other selected wavelengths to produce said second group of pulses.

37. The method of claim 34, further comprising controlling the optical power of at least one of the one or more optical inputs.

38. A method of processing an RF signal, comprising:
multiplexing one or more optical inputs;
modulating an RF signal onto the one or more optical inputs;
sending the one or more modulated optical inputs to a chirped fiber grating;
demultiplexing one or more optical pulses reflected from the chirped fiber grating;
sending the one or more pulses to an optical microelectromechanical switch; and
configuring the optical microelectromechanical switch to send a first group of pulses to a first multiplexer coupled to a first input port of a differential detector and to send a second group of pulses to a second multiplexer coupled to a second input port of the differential detector.

39. The method of claim 38, further comprising controlling the optical power of at least one of the one or more optical inputs.

40. A bipolar transversal filter, comprising:
a first circulator for receiving a composite optical signal having optical signals at multiple wavelengths;
a fiber grating coupled to said circulator, said fiber grating receiving said composite optical signal from said circulator and transmitting a reflected composite optical signal back to said circulator; and an optical filter receiving said reflected composite optical signal and providing optical signals at selected wavelengths at a first output and providing optical signals at other selected wavelengths at a second output, wherein said optical filter comprises:
an optical isolator receiving said reflected composite optical signal from said circulator;
a first optical subfilter coupled to said optical isolator, said first optical subfilter passing optical signals at selected optical wavelengths to said first output; and
a second optical subfilter coupled to said optical isolator, said second optical subfilter passing optical signals at other selected optical wavelengths to said second output.

41. The bipolar transversal filter according to claim 40, wherein said first optical subfilter and said second optical subfilter comprise Fabry-Perot etalons.

42. The bipolar transversal filter according to claim 41, wherein said composite optical signal comprises optical signals spaced at 100 GHz spacing and each Fabry-Perot etalon has a free spectral range of 200 GHz, and wherein the Fabry-Perot etalon of said first optical subfilter passes optical signals at every other spacing and the Fabry-Perot etalon of said second optical subfilter passes optical signals at those wavelengths not passed by said first optical subfilter.

43. A bipolar transversal filter, comprising:
a first circulator for receiving a composite optical signal having optical signals at multiple wavelengths;
a fiber grating coupled to said circulator, said fiber grating receiving said composite optical signal from said circulator and transmitting a reflected composite optical signal back to said circulator; and
an optical filter receiving said reflected composite optical signal and providing optical signals at selected wavelengths at a first output and providing optical signals at other selected wavelengths at a second output, wherein said optical filter comprises:
an optical wavelength demultiplexer receiving said reflected composite optical signal from said first circulator, said optical wavelength demultiplexer providing a plurality of output optical signals at the wavelengths of the composite optical signal; and
an optical switch array switching selected output optical signals to a first optical multiplexer coupled to said first output or to a second optical multiplexer coupled to said second output.

44. The bipolar transversal filter according to claim 43, wherein said optical switch array comprises an M×M optical micro-electromechanical system (MEMS) switch array.

45. A bipolar transversal filter, comprising:
a first circulator for receiving a composite optical signal having optical signals at multiple wavelengths;
a fiber grating coupled to said circulator, said fiber grating receiving said composite optical signal from said circulator and transmitting a reflected composite optical signal back to said circulator; and
an optical gratingless filter receiving said reflected composite optical signal and providing optical signals at selected wavelengths at a first output and providing optical signals at other selected wavelengths at a second output,
wherein the optical powers of the optical signals at multiple wavelengths are controlled to produce a desired response from said bipolar transversal filter.

46. A bipolar transversal filter, comprising:
  a first circulator for receiving a composite optical signal having optical signals at multiple wavelengths;
  a fiber grating coupled to said circulator, said fiber grating receiving said composite optical signal from said circulator and transmitting a reflected composite optical signal back to said circulator; and
  an optical filter receiving said reflected composite optical signal and providing optical signals at selected wavelengths at a first output and providing optical signals at other selected wavelengths at a second output,
  wherein said fiber grating comprises a chirped fiber grating.

47. A bipolar transversal filter, comprising:
  a first circulator for receiving a composite optical signal having optical signals at multiple wavelengths;
  a fiber grating coupled to said circulator, said fiber grating receiving said composite optical signal from said circulator and transmitting a reflected composite optical signal back to said circulator;
  an optical gratingless filter receiving said reflected composite optical signal and providing optical signals at selected wavelengths at a first output and providing optical signals at other selected wavelengths at a second output; and
  a differential detector coupled to said first output and said second output of said optical gratingless filter and producing an electrical signal corresponding to the difference between the first output and the second output of said optical filter.

48. A bipolar transversal filter, comprising:
  means for applying wavelength-dependent time delays to multiple optical signals at different wavelengths, said means for applying wavelength-dependent time delays receiving a composite optical signal comprising multiple optical signals at different wavelengths and providing a delayed composite optical signal comprising multiple optical signals at different wavelengths with different delays;
  means for directing said composite optical signal into said means for applying wavelength-dependent time delays and directing said delayed composite optical signal out of said means for applying wavelength-dependent time delays; and
  means for filtering without a grating, said means for filtering receiving said delayed composite optical signal and filtering said delayed composite optical signal to provide one or more optical signals at selected optical wavelengths at a first output and one or more optical signals at other selected optical wavelengths at a second output, wherein said means for filtering comprises:
    a first means for subfiltering, said first means for subfiltering passing optical signals at selected optical wavelengths to said first output; and
    a second means for subfiltering, said second means for subfiltering passing optical signals at other selected optical wavelengths to said second output.

49. The bipolar transversal filter according to claim 48, wherein said first and second means for subfiltering each comprise a Fabry-Perot etalon.

50. The bipolar transversal filter according to claim 49, wherein said composite optical signal comprises optical signals spaced at 100 GHz spacing and each Fabry-Perot etalon has a free spectral range of 200 GHz, and wherein the Fabry-Perot etalon of said first means for subfiltering passes optical signals at every other spacing and the Fabry-Perot etalon of said second means for subfiltering passes optical signals at those wavelengths not passed by said first means for subfiltering.

51. A bipolar transversal filter, comprising:
  means for applying wavelength-dependent time delays to multiple optical signals at different wavelengths, said means for applying wavelength-dependent time delays receiving a composite optical signal comprising multiple optical signals at different wavelengths and providing a delayed composite optical signal comprising multiple optical signals at different wavelengths with different delays;
  means for directing said composite optical signal into said means for applying wavelength-dependent time delays and directing said delayed composite optical signal out of said means for applying wavelength-dependent time delays; and
  means for filtering, said means for filtering receiving said delayed composite optical signal and filtering said delayed composite optical signal to provide one or more optical signals at selected optical wavelengths at a first output and one or more optical signals at other selected optical wavelengths at a second output, wherein said means for filtering comprises:
    means for demultiplexing said delayed composite optical signal to provide a plurality of output optical signals at the wavelengths of the composite optical signal; and
    means for switching selected output optical signals to a first means for multiplexing optical signals or to a second means for multiplexing optical signals, said first means for multiplexing coupled to said first output and said second means for multiplexing coupled to said second output.

52. The bipolar transversal filter according to claim 51, wherein said means for switching comprises an M×M optical micro-electromechanical system (MEMS) switch array.

53. A bipolar transversal filter, comprising:
  means for applying wavelength-dependent time delays to multiple optical signals at different wavelengths, said means for applying wavelength-dependent time delays receiving a composite optical signal comprising multiple optical signals at different wavelengths and providing a delayed composite optical signal comprising multiple optical signals at different wavelengths with different delays;
  means for directing said composite optical signal into said means for applying wavelength-dependent time delays and directing said delayed composite optical signal out of said means for applying wavelength-dependent time delays;
  means for filtering without a grating, said means for filtering receiving said delayed composite optical signal and filtering said delayed composite optical signal to provide one or more optical signals at selected optical wavelengths at a first output and one or more optical signals at other selected optical wavelengths at a second output; and
  a means for producing an electrical signal coupled to said first output and said second output of means for filtering, said electrical signal corresponding to the difference between the first output and the second output from said means for filtering.

54. A method of filtering a composite optical signal comprising multiple optical signals at different wavelengths, said method comprising:

delaying said multiple optical signals at different wavelengths with different delays dependent on said different wavelengths to provide a delayed composite optical signal; and filtering without a grating said delayed composite optical signal to provide one or more optical signals at selected optical wavelengths at a first output and one or more optical signals at other selected optical wavelengths at a second output, wherein said filtering said delayed composite optical signal comprises:

subfiltering said delayed composite optical signal to pass optical signals at selected optical wavelengths to said first output; and subfiltering said delayed composite optical signal to pass optical signals at other selected optical wavelengths to said second output.

55. The method according to claim 54, wherein said subfiltering is performed by a first and a second Fabry-Perot etalon.

56. The method according to claim 55, wherein said composite optical signal comprises optical signals spaced at 100 GHz spacing and each Fabry-Perot etalon has a free spectral range of 200 GHz, and wherein the first Fabry-Perot etalon passes optical signals at every other spacing and the second Fabry-Perot etalon passes optical signals at those wavelengths not passed by the first Fabry-Perot etalon.

57. A method of filtering a composite optical signal comprising multiple optical signals at different wavelengths, said method comprising:

delaying said multiple optical signals at different wavelengths with different delays dependent on said different wavelengths to provide a delayed composite optical signal; and filtering said delayed composite optical signal to provide one or more optical signals at selected optical wavelengths at a first output and one or more optical signals at other selected optical wavelengths at a second output, wherein said filtering said delayed composite optical signal comprises:

demultiplexing said delayed composite optical signal to provide a plurality of output optical signals at the wavelengths of the composite optical signal;

switching selected output optical signals to a first set of optical switch outputs or to a second set of optical switch outputs;

multiplexing said first set of optical switch outputs to provide said one or more optical signals at selected optical wavelengths at said first output; and multiplexing said second set of optical switch outputs to provide said one or more optical signals at other selected optical wavelengths at said second output.

58. A method of filtering a composite optical signal comprising multiple optical signals at different wavelengths, said method comprising:

delaying said multiple optical signals at different wavelengths with different delays dependent on said different wavelengths to provide a delayed composite optical signal;

filtering without a grating said delayed composite optical signal to provide one or more optical signals at selected optical wavelengths at a first output and one or more optical signals at other selected optical wavelengths at a second output; and producing an electrical signal corresponding to the difference between said first output and said second output.

\* \* \* \* \*